O. Pier,
Horse Rake.
No. 25441 — Patented Sep. 13, 1859.
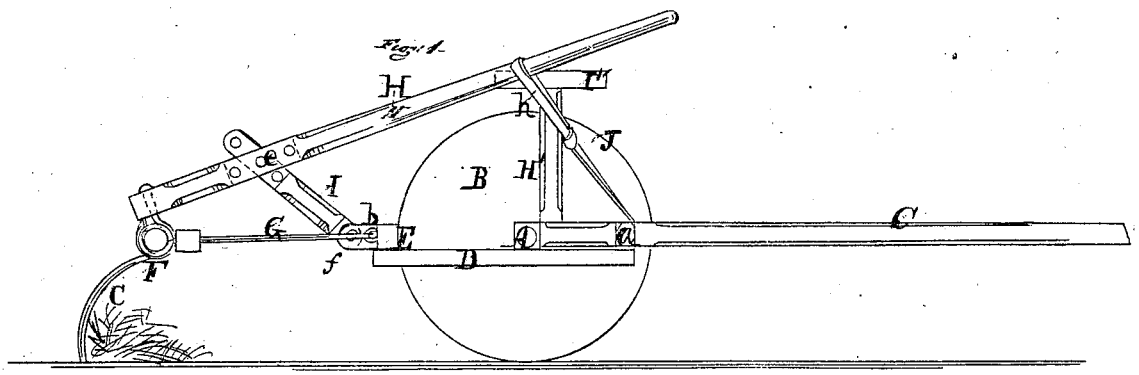
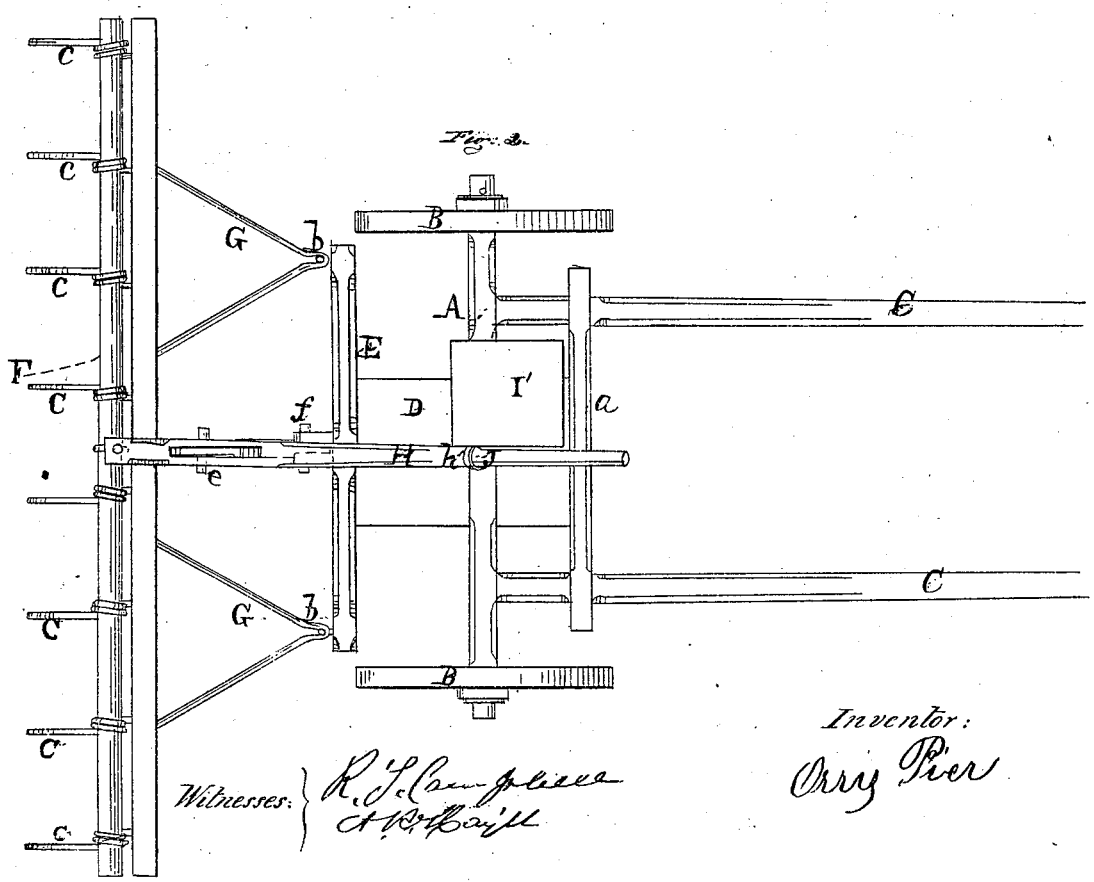
Witnesses: R. S. Campbell, A. W. Cargill
Inventor: Orry Pier

UNITED STATES PATENT OFFICE.

ORRIS PIER, OF LUDLOW, VERMONT.

IMPROVEMENT IN HORSE-RAKES.

Specification forming part of Letters Patent No. 25,441, dated September 13, 1859.

*To all whom it may concern:*

Be it known that I, ORRIS PIER, of Ludlow, in the county of Windsor and State of Vermont, have invented a new and Improved Horse-Rake; and I do hereby declare that the following is a full, clear, and exact description of the same, reference being had to the annexed drawings, making a part of this specification, in which—

Figure 1 is a side view of my invention. Fig. 2 is a plan or top view of the same.

Similar letters of reference indicate corresponding parts in the two figures.

The object of this invention is to obtain a rake that may be readily raised and lowered for the purpose of having its load discharged, and also readily adjusted, so that the ends of the teeth may be at the desired height from the surface of the ground and the rake enabled to gather or rake up the hay without having its teeth catch into the ground—a contingency which frequently occurs in using the wire-tooth rake, greatly increasing their draft and the wear and tear of the implement.

To enable those skilled in the art to fully understand and construct my invention, I will proceed to describe it.

A represents an axle having a wheel, B, at each end, and thills C, attached to it.

To the axle A and the cross-bar $a$ of the thills a platform, D, is secured. This platform projects some distance back of the axle A, and has a traverse-bar, E, attached to it, the ends of said bar projecting beyond the sides of the platform nearly as far as the wheels B B, as shown clearly in Fig. 2.

To the traverse-bar E a rake, F, is attached by rods G. These rods are connected to the bar E by joints $b\ b$, so that the rake may freely rise and fall. The rake F is provided with the curved wire teeth $c$, and, being of ordinary construction, does not require a minute description.

To the rake-head $d$ the outer end of a lever, H, is attached. This lever H is secured by a fulcrum-pin, $e$, to a bar, I, the lower end of which is attached by a joint, $f$, to the traverse-bar E. The fulcrum-pin $e$ may pass through either of a series of holes, $g$, in the lever and bar. (See Fig. 1.)

To the platform D an upright, H', is attached, said upright having a driver's seat, I', on its upper end, in close proximity to the inner or front end of the lever H.

To the cross-bar $a$ of the thills a strap, J, is attached. This strap has a loop, $h$, formed at its end, either by a buckle or other means. This loop $h$ receives the inner or front end of the lever H, and the loop is so made as to retain the rake F and keep the ends of its teeth $c$ sufficiently above the earth to prevent the same from catching therein, and at the same time permitting the ends of the teeth to extend sufficiently low to catch all the hay or grass. When the hollow of the rake is full the attendant or driver on the seat I' depresses the end of the lever H, and thereby elevates the rake and discharges its load, the rake descending to its proper position by its own gravity when the attendant releases the lever H.

From the above description it will be seen that the rake F is under the complete control of the driver or attendant, the rake being readily raised, in order that its load may be discharged and kept in a proper elevated state, and also readily kept at the desired height in order to prevent its teeth catching into the earth.

I do not claim broadly attaching a rake to a mounted frame by means of joints, so as to permit the rake to be elevated for the purpose of being unloaded, irrespective of the arrangement herein shown and described, for such device has been previously used; but I do claim as new and desire to secure by Letters Patent—

The arrangement and combination of the jointed adjustable bar I, lever H, bar E, rods G, rake F, strap J, and seat I', as and for the purpose herein set forth and described.

ORRIS PIER.

Witnesses:
R. S. SPENCER,
A. K. HAIGHT.